United States Patent
Kim et al.

(10) Patent No.: US 11,803,322 B2
(45) Date of Patent: Oct. 31, 2023

(54) MEMORY SYSTEM AND OPERATING METHOD SUPPORTING FAST BOOT USING HOST MEMORY BUFFER AND DEFAULT ENABLED INFORMATION

(71) Applicant: SK hynix Inc., Gyeonggi-do (KR)

(72) Inventors: Jeong Hyun Kim, Gyeonggi-do (KR); Byong Woo Ryu, Gyeonggi-do (KR); Ji Hun Choi, Gyeonggi-do (KR); Son Hong Min, Gyeonggi-do (KR); Sung Ju Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

(21) Appl. No.: 17/575,089

(22) Filed: Jan. 13, 2022

(65) Prior Publication Data

US 2022/0350529 A1 Nov. 3, 2022

(30) Foreign Application Priority Data

May 3, 2021 (KR) .......................... 10-2021-0057295
Jun. 16, 2021 (KR) .......................... 10-2021-0078335
Sep. 7, 2021 (KR) .......................... 10-2021-0118776

(51) Int. Cl.
*G06F 3/06* (2006.01)
*G06F 13/16* (2006.01)

(52) U.S. Cl.
CPC .......... *G06F 3/0656* (2013.01); *G06F 3/0625* (2013.01); *G06F 3/0679* (2013.01); *G06F 13/1668* (2013.01); *G06F 13/1673* (2013.01)

(58) Field of Classification Search
CPC ............. G06F 13/1668; G06F 13/1673; G06F 3/0656; G06F 3/0625; G06F 3/0679; G06F 13/16; G06F 3/0659; Y02D 10/00
See application file for complete search history.

(56) References Cited

U.S. PATENT DOCUMENTS

| | | | |
|---|---|---|---|
| 2017/0242606 A1* | 8/2017 | Vlaiko ................ | G06F 13/4282 |
| 2018/0107417 A1* | 4/2018 | Shechter ............... | G06F 3/0619 |
| 2020/0151055 A1* | 5/2020 | Eom .................... | G06F 3/0619 |
| 2022/0327244 A1* | 10/2022 | Benisty ................ | G06F 21/602 |

* cited by examiner

*Primary Examiner* — Charles Rones
*Assistant Examiner* — Hewy H Li
(74) *Attorney, Agent, or Firm* — IP & T GROUP LLP

(57) ABSTRACT

Embodiments of the present disclosure relate to a memory system and an operating method of the memory system. According to embodiments of the present disclosure, the memory system may receive a default enabled information from the host. The default enabled information indicates whether the host maintains a configuration of a host memory buffer in the host and target data stored in the host memory buffer when the memory system is in a low power mode state in which power supplied from the host is cut off.

20 Claims, 20 Drawing Sheets

MEMORY SYSTEM AND OPERATING METHOD SUPPORTING FAST BOOT USING HOST MEMORY BUFFER AND DEFAULT ENABLED INFORMATION

CROSS-REFERENCE TO RELATED APPLICATION

The present application claims priority under 35 U.S.C. 119(a) to Korean patent application number 10-2021-0057295 filed on May 3, 2021, Korean patent application number 10-2021-0078335 filed on Jun. 16, 2021 and Korean patent application number 10-2021-0118776 filed on Sep. 7, 2021 which are incorporated herein by reference in their entireties.

TECHNICAL FIELD

Various embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

Moreover, the memory system may share data with the host by accessing a host memory buffer included in the host. In general, the memory system may access the host memory buffer after receiving a command from the host indicating that the host memory buffer is accessible.

SUMMARY

Embodiments of the present disclosure may provide a memory system and an operating method of the memory system capable of reducing the time for accessing data stored in a host memory buffer within a host when a memory system wakes up from a low power mode state.

Embodiments of the present disclosure may provide a memory system and an operating method of the memory system capable of reducing the time for booting a memory system in the process of waking the system from a low power mode state.

In one aspect, embodiments of the present disclosure may provide a memory system including a memory device capable of storing data, and a memory controller configured to communicate with the memory device to control the memory device.

The memory controller may receive a default enabled information from a host in communication with the memory system. The default enabled information indicates whether the host maintains a configuration of a host memory buffer in the host and target data stored in the host memory buffer when the memory system is in a low power mode state in which power supplied from the host is cut off.

The memory controller may determine, according to the default enabled information, a target time which is a time point at which the memory system accesses the target data after waking up from the low power mode state.

In this case, the memory controller may determine the target time as a time point at which a communication link between the host and the memory system is accessible, if the default enabled information indicates that the host maintains the configuration of the host memory buffer and the target data stored in the host memory buffer when the memory system is in the low power mode state.

In addition, the memory controller may determine the target time as a time point of receiving from the host a set feature command indicating that the host memory buffer is accessible, if the default enabled information indicates that the host does not maintain the configuration of the host memory buffer and the target data stored in the host memory buffer when the memory system is in the low power mode state.

The memory controller may access the target data stored in the host memory buffer at the target time.

In another aspect, embodiments of the present disclosure may provide an operating method of a memory system including a memory device capable of storing data.

The operating method of a memory system may include establishing a communication link between the memory system and a host in communication with the memory system.

The operating method of a memory system may include receiving a default enable information from the host. The default enabled information indicates whether the host maintains a configuration of a host memory buffer in the host and target data stored in the host memory buffer when the memory system is in a low power mode state in which power supplied from the host is cut off.

The operating method of a memory system may further include determining, according to the default enabled information, a target time which is a time point at which the memory system accesses the target data after waking up from the low power mode state.

In this case, if the default enabled information indicates that the host maintains the configuration of the host memory buffer and the target data stored in the host memory buffer when the memory system is in the low power mode state, the target time may be determined as a time point at which a communication link between the host and the memory system is accessible.

In addition, if the default enabled information indicates that the host does not maintain the configuration of the host memory buffer and the target data stored in the host memory buffer when the memory system is in the low power mode state, the target time may be determined as a time point of receiving from the host a set feature command indicating that the host memory buffer is accessible.

The operating method of a memory system may further include accessing the target data stored in the host memory buffer at the target time.

According to embodiments of the present disclosure, it is possible to reduce the time for accessing the data stored in the host memory buffer in the host when the memory system wakes up from the low power mode state, and it is possible to reduce the time for booting the memory system in the process of waking up the memory system from the low power mode state.

DETAILED DESCRIPTION

Figure 1:
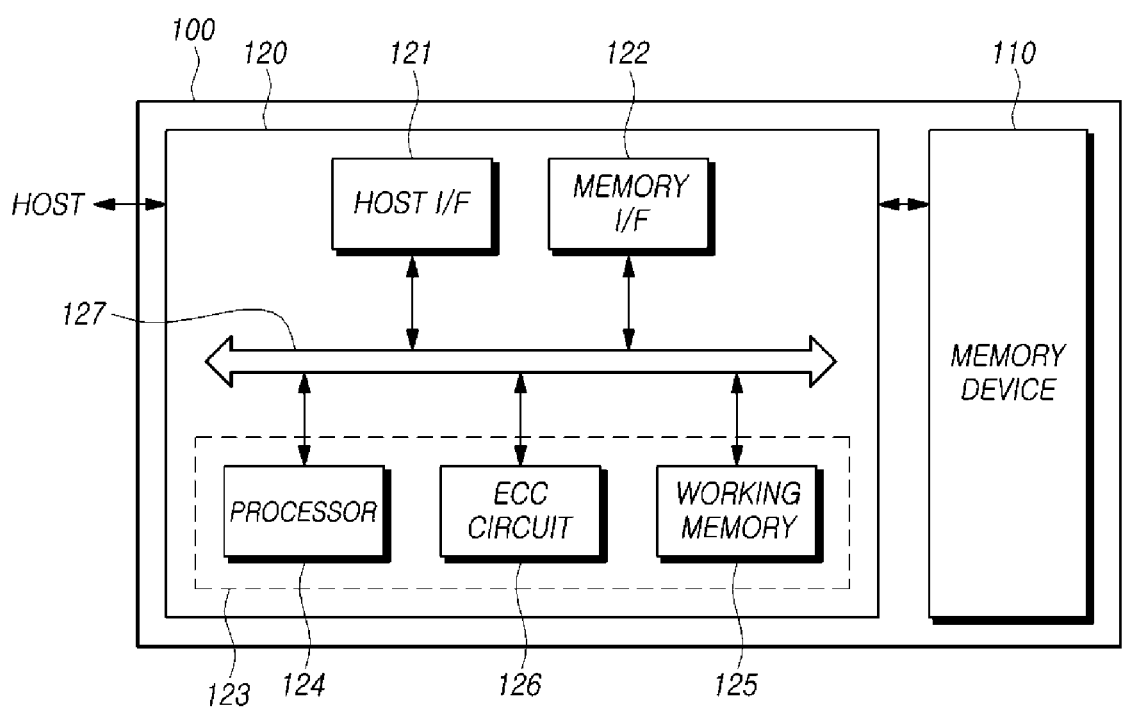
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in, at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. That is, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all of the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
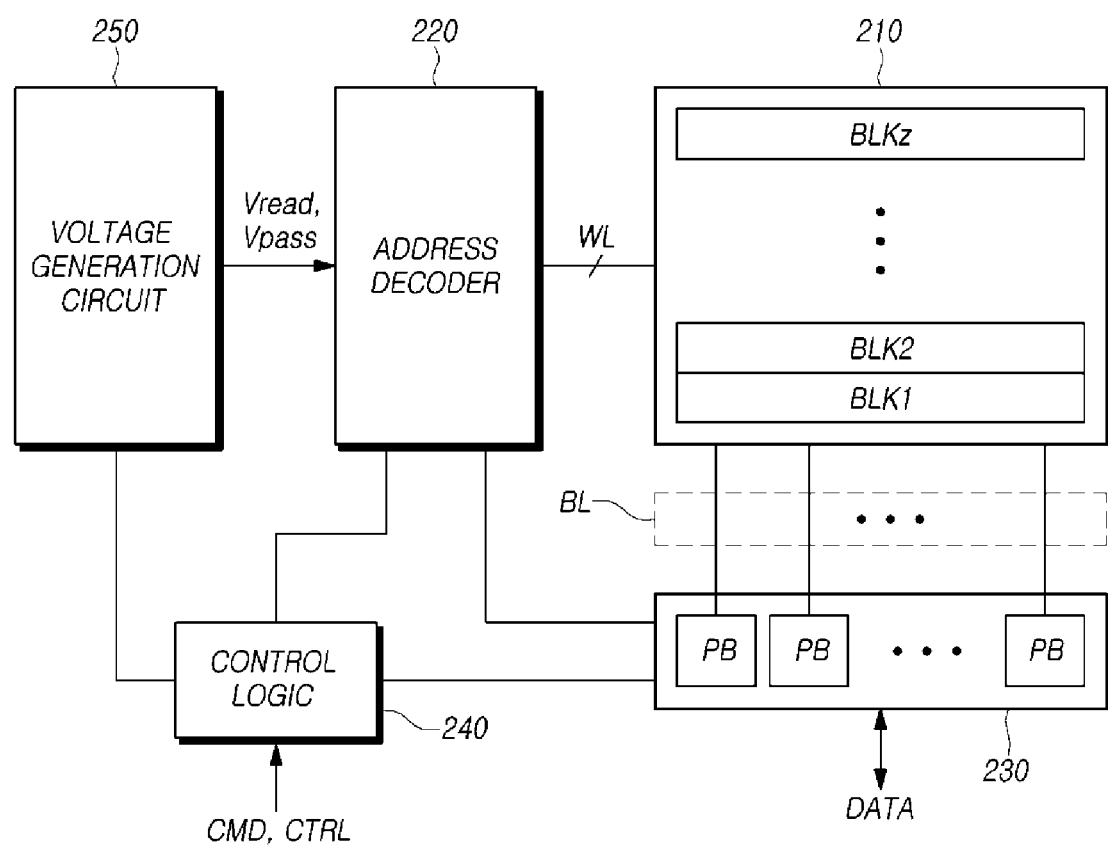
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a s read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
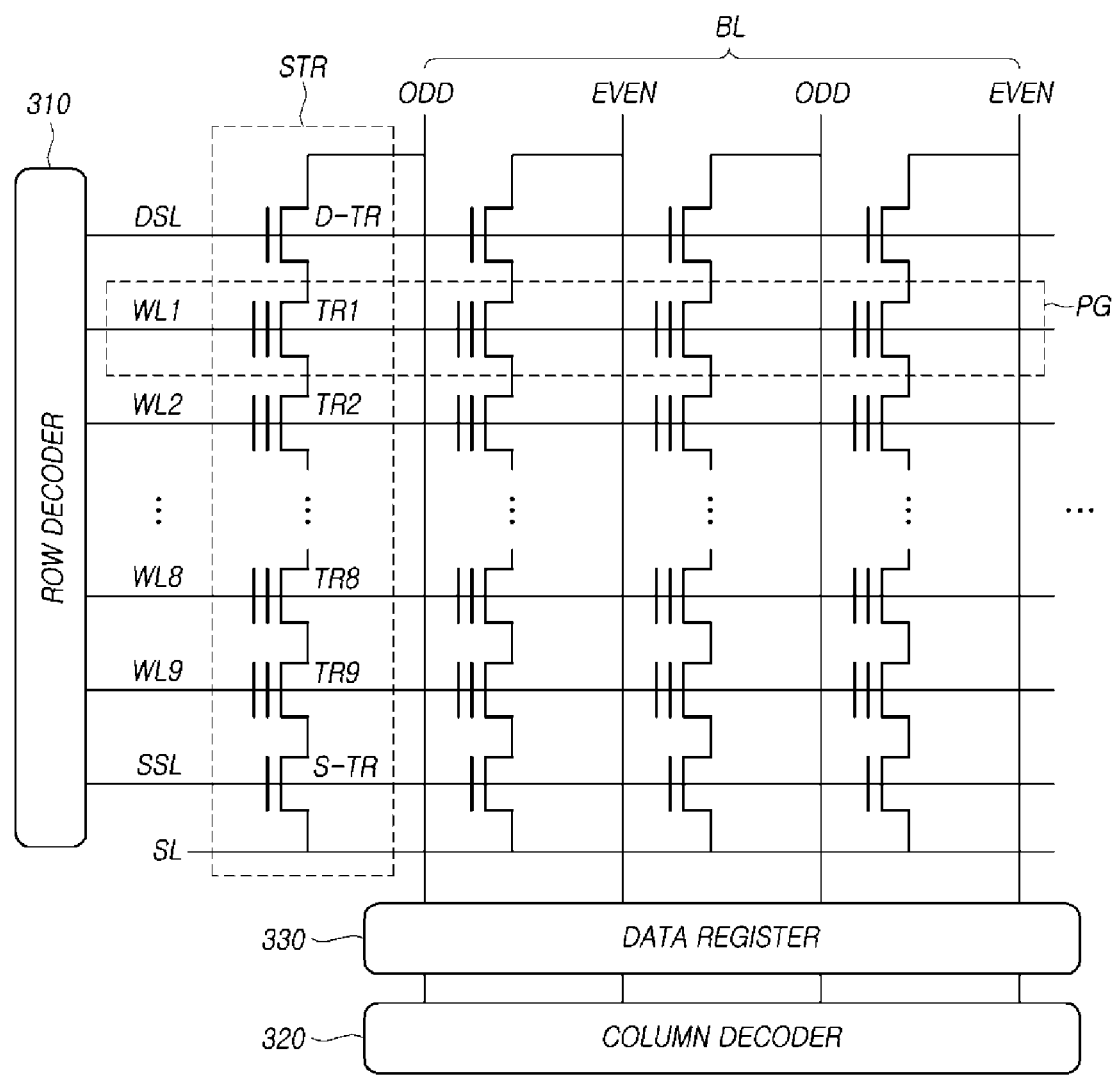
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) which includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
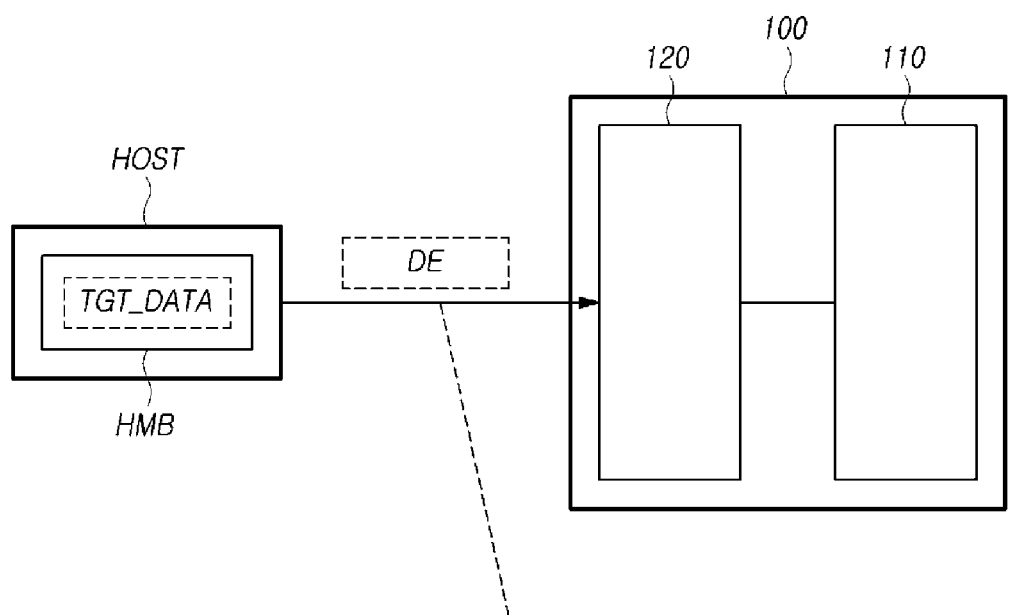
FIG. 4 illustrates a schematic operation of a memory system according to embodiments of the present disclosure.

FIG. 4 illustrates a schematic operation of a memory system 100 according to embodiments of the present disclosure.

Referring to FIG. 4, the memory system 100 may include a memory device 110 capable of storing data, and a memory controller 120 which communicates with the memory device 110 and controls the memory device 110.

In addition, the memory system 100 may communicate with a host HOST. The host HOST and the memory system 100 may communicate through various types of interfaces.

As an example, the memory system 100 may communicate with a host HOST through an NVMe (Non-Volatile Memory express) interface. That is, the host HOST may transmit commands and data to the memory system 100 through the NVMe interface. In addition, after processing a command received from the host HOST, the memory system 100 may transmit a response to the command to the host HOST through the NVMe interface.

In FIG. 4, the memory controller 120 of the memory system 100 may receive default enabled information DE from the host HOST.

The default enabled information DE means information indicating whether the host HOST maintains a configuration of a host memory buffer HMB in the host HOST and the target data TGT_DATA stored in the host memory buffer HMB when the memory system 100 is in a low power mode state.

The memory system 100 may enter the low power mode state when power supplied from the host HOST is cut off. When entering the low power mode state, the memory system 100 operates to consume less power than when power is normally supplied from the host HOST. For example, when the memory system 100 communicates with the host through the NVMe interface, the low power mode state may be a runtime D3 (RTD3) state.

The memory system 100 may reduce power consumption by entering the low power mode state if it is necessary to reduce power consumption (e.g. power supplied from the host HOST is cut off). Thereafter, the memory system 100 may wake up from the low power mode state in the case that power supply from the host HOST is resumed.

Thus, even when the memory system 100 enters the low power mode state, the host HOST may normally use power. In this case, the host HOST may maintain the configuration of the host memory buffer HMB and the target data TGT_DATA stored in the host memory buffer HMB.

In the case when the host HOST maintains the configuration of the host memory buffer HMB and the target data stored in the host memory buffer HMB even when the memory system 100 is in the low power mode state, after waking up from the low power mode state the memory system 100 may access the host memory buffer HMB based on information already known about the host memory buffer HMB even if the memory system 100 does not receive a command indicating that the host memory buffer is accessible from the host HOST. Accordingly, the memory system 100 may reduce the time required for accessing the host memory buffer HMB after waking up from the low power mode state.

Specifically, if the default enabled information DE is a first value VAL_1, the default enabled information DE may indicate that the host HOST maintains the configuration of the host memory buffer HMB and the target data TGT_DATA stored in the host memory buffer HMB when the memory system 100 is in the low power mode state. In addition, if the default enabled information DE is a second value VAL_2, the default enabled information DE may indicate that the host HOST does not maintain the configuration of the host memory buffer HMB and the target data TGT_DATA stored in the host memory buffer HMB when the memory system 100 is in the low power mode state. In this case, the first value VAL_1 and the second value VAL_2 may be set to arbitrary values (e.g., the first value is 1, the second value is 0), and the second value VAL_2 is different from the first value VAL_1.

Figure 5:
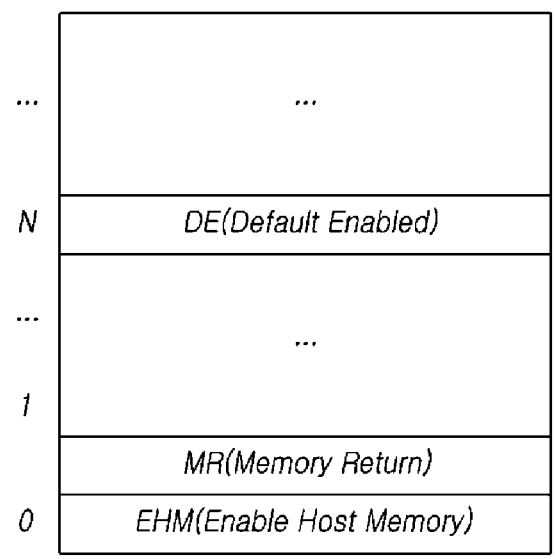
FIG. 5 illustrates an example of a method for a memory system to receive default enabled information from a host according to embodiments of the present disclosure.

FIG. 5 illustrates an example of a method for a memory system 100 to receive default enabled information from a host HOST according to embodiments of the present disclosure.

Referring to FIG. 5, the memory controller 120 of the memory system 100 may receive the default enabled information DE from the host HOST by using a specific double word (DWORD) of a set features command for the host memory buffer HMB. As an example, the specific DWORD may be DWORD 11.

In FIG. 5, the 0th bit of a specific DWORD (e.g., DWORD 11) of the set features command for the host memory buffer HMB is an EHM (Enable Host Memory) bit and the 1st bit is a MR (Memory Return) bit.

The EHM bit is a bit indicating whether the host HOST enables or disables the host memory buffer HMB. In general, the host HOST transmits a set feature command in which the value of the EHM bit is set to 0 to the memory system 100 before the memory system 100 enters the low power mode state to disable the memory system 100 from accessing the host memory buffer HMB. In addition, the host HOST transmits a set feature command in which the value of the EHM bit is set to 1 after the memory system 100 wakes up from the low power mode state to the memory system 100, thereby enabling the memory system 100 to access the host memory buffer HMB. In this case, the memory system 100 cannot access the host memory buffer HMB before receiving the set feature command in which the value of the EHM bit is set to 1 from the host HOST.

In addition, the MR bit indicates whether the host HOST can equally use the properties (e.g., address, size) of the area previously allocated as the host memory buffer HMB, as the host memory buffer (HMB). In this case, the memory system 100 may utilize the information of the MR bit in the process of accessing the host memory buffer HMB awakened from the low power mode state. However, the MR bit does not indicate whether the configuration of the host memory buffer HMB and data stored in the host memory buffer HMB are maintained when the memory system 100 is in the low power mode state.

In this case, the N-th bit of DWORD 11 of the set features command for the host memory buffer HMB may be a bit corresponding to the default enabled information DE. In this case, N may be any natural number of 2 or more.

In the above, the characteristics of the default enabled information DE and a method of transmitting the default enabled information DE have been described. Hereinafter, an example of a specific method in which the memory system 100 uses the default enabled information DE will be described.

Figure 6:
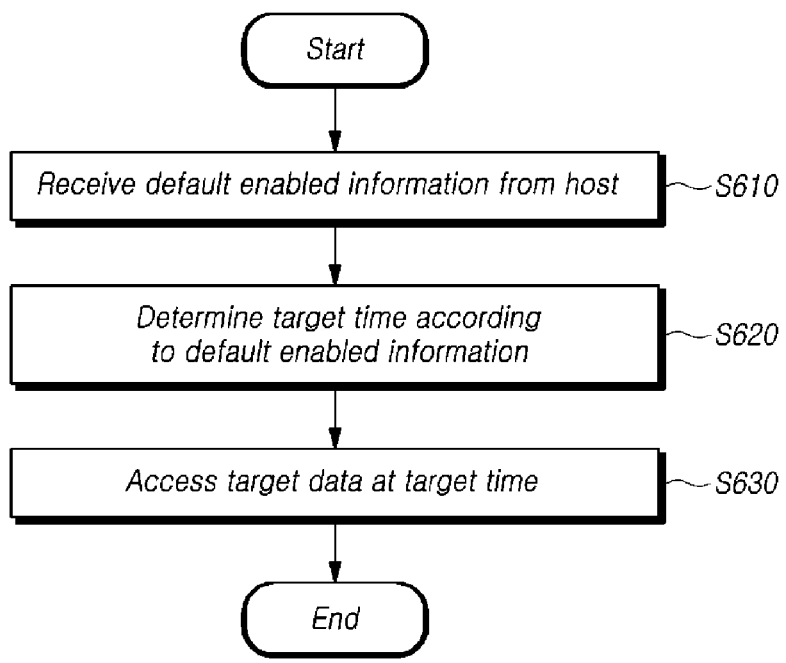
FIG. 6 is a flowchart illustrating an operation in which a memory system accesses target data according to default enabled information according to embodiments of the present disclosure.

FIG. 6 is a flowchart illustrating an operation in which a memory system 100 accesses target data TGT_DATA according to default enabled information DE according to embodiments of the present disclosure.

Referring to FIG. 6, as described with reference to FIG. 4, the memory controller 120 of the memory system 100 may receive the default enabled information DE from the host HOST (S610).

Further, the memory controller 120 may determine a target time according to the default enabled information DE received in operation S610 (S620). In this case, the target time refers to a time point at which the memory system 100 accesses the target data TGT_DATA stored in the host memory buffer HMB after waking up from the low power mode state.

The memory controller 120 may access the target data TGT_DATA stored in the host memory buffer HMB at the target time (S630).

That is, the memory controller 120 may differently determine the timing of accessing the target data TGT_DATA stored in the host memory buffer HMB according to the default enabled information DE.

Hereinafter, an operation in which the memory system 100 accesses the target data TGT_DATA based on the determined target time with reference to a sequence diagram will be described.

Figure 7:
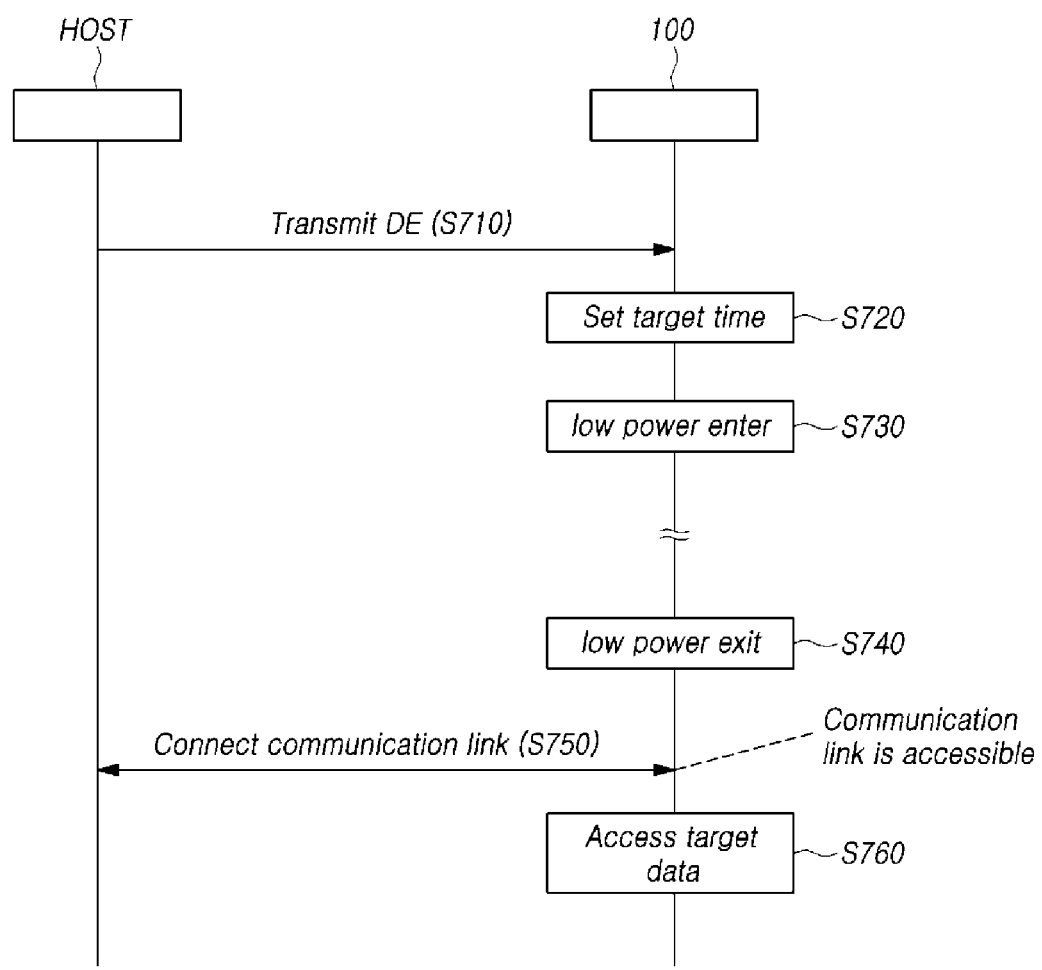
FIG. 7 is a sequence diagram illustrating an example of an operation in which a memory system accesses target data according to embodiments of the present disclosure.

FIG. 7 is a sequence diagram illustrating an example of an operation in which a memory system 100 accesses target data TGT_DATA according to embodiments of the present disclosure.

Referring to FIG. 7, first, the host HOST may transmit the default enabled information DE to the memory system 100 (S710). In this case, the value of the default enabled information DE is a first value VAL_1. The default enabled information DE indicates that the host HOST maintains the configuration of the host memory buffer HMB and the target data stored in the host memory buffer HMB when the memory system 100 is in the low power mode state.

The memory system 100 may determine the target time as a time point at which a communication link between the host HOST and the memory system 100 is accessible based on the default enabled information DE received in operation S710. (S720). The time point at which the communication link between the host HOST and the memory system 100 is accessible refers to a time point at which data communication is possible between the host HOST and the memory system 100 by completing the PCIe (Peripheral Component Interconnect Bus express) link identification with each other. This is before the time when the host HOST and the memory system 100 can communicate with each other through the NVMe interface (that is, the time when a controller enable operation is completed).

Thereafter, the memory system 100 may enter a low power mode state (S730). For example, the memory system 100 may enter the low power mode state to reduce power consumption when power supply from the host HOST is cut off as described above.

Thereafter, the memory system 100 may wake up from the low power mode state (S740). For example, the memory system 100 may wake up from the low power mode state when power supply from the host is resumed after entering the low power mode state. After waking up from the low power mode state, the memory system 100 may connect a communication link to the host HOST (S750).

In operation S750, since the target time, that is, the time point when the communication link between the host HOST and the memory system 100 is accessible, has elapsed, the memory system 100 may access the target data TGT_DATA stored in the host memory buffer HMB (S760). Since the host HOST maintains the configuration of the host memory buffer HMB and the target data TGT_DATA stored in the host memory buffer HMB even while the memory system 100 enters the low power mode state, the memory system 100 may access the target data TGT_DATA stored in the host memory buffer HMB immediately when the communication link between the host HOST and the memory system 100 is accessible.

Figure 8:
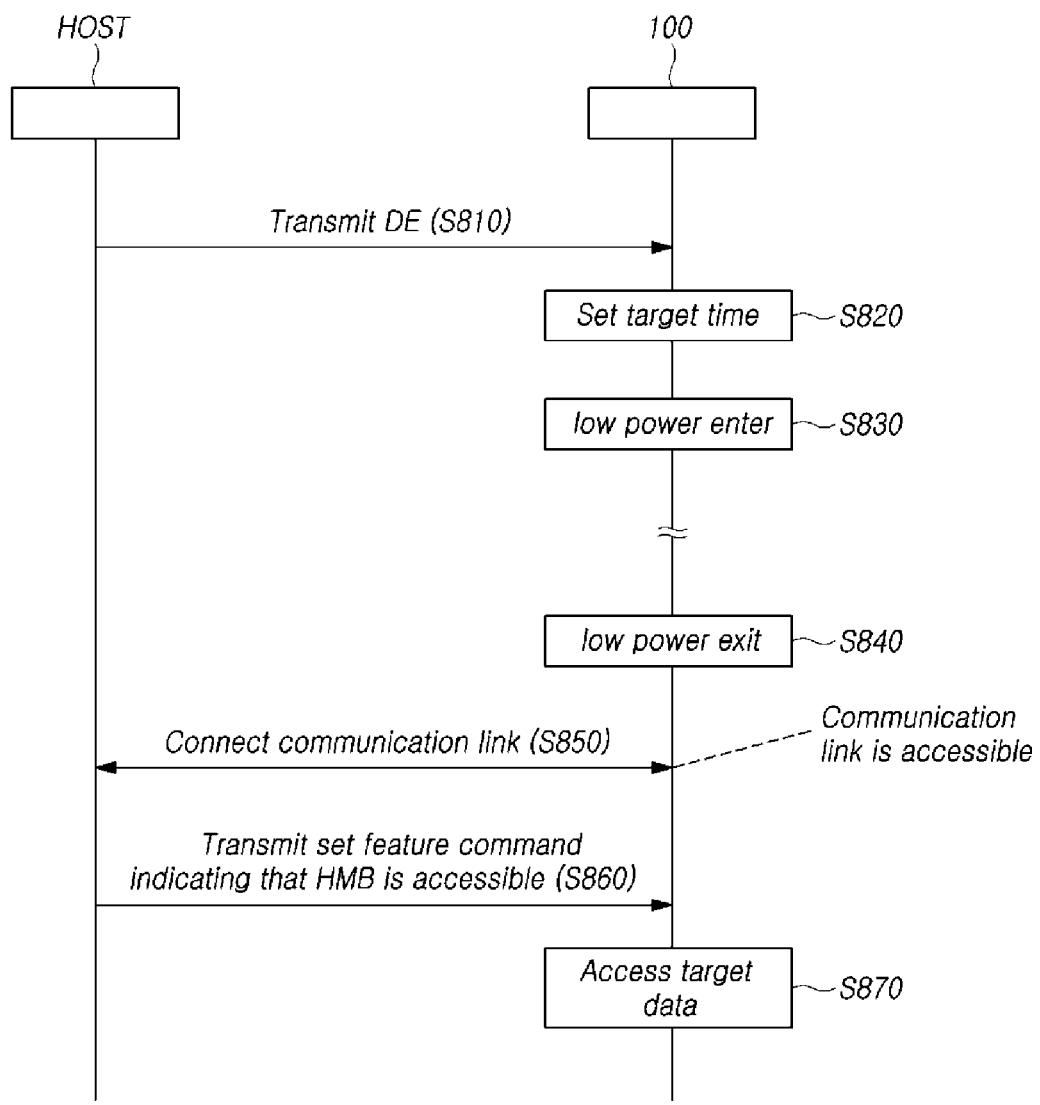
FIG. 8 is a sequence diagram illustrating another example of an operation in which a memory system accesses target data according to embodiments of the present disclosure.

FIG. 8 is a sequence diagram illustrating another example of an operation in which a memory system 100 accesses target data according to embodiments of the present disclosure.

Referring to FIG. 8, the host HOST may transmit a default enabled information DE to the memory system 100 (S810). In this case, the value of the default enabled information DE is a second value VAL_2. The default enabled information DE indicates that the host HOST does not maintain the configuration of the host memory buffer HMB and target data stored in the host memory buffer HMB when the memory system 100 is in a low power mode state.

The memory system 100 may determine, based on the default enabled information DE received in operation S810, the target time as the time point when receiving from the host HOST a set feature command indicating that the host memory buffer HMB is accessible (S820).

Thereafter, the memory system 100 may enter a low power mode state (S830). For example, the memory system 100 may enter the low power mode state to reduce power consumption when power supply from the host HOST is cut off as described above.

Thereafter, the memory system 100 may wake up from the low power mode state (S840). For example, the memory system 100 may wake up from the low power mode state when power supply from the host is resumed after entering the low power mode state. After waking up from the low power mode state, the memory system 100 may connect a communication link to the host HOST (S850).

Moreover, in operation S850, the time point when the communication link between the host (HOST) and the memory system 100 is accessible has already elapsed, however, the memory system 100 cannot yet access the target data TGT_DATA stored in the host memory buffer HMB. This is because, since the value of the received default enabled information DE is the second value VAL_2, it cannot be guaranteed that the host HOST maintains the configuration of the host memory buffer HMB and the target data TGT_DATA while the memory system 100 enters the low power mode state.

Thereafter, the host HOST may transmit a set feature command indicating that the host memory buffer HMB is accessible to the memory system 100 (S860). In this case, in the set feature command transmitted to the memory system 100, the EHM bit may be set to 1. Since the target time has elapsed after the operation S860, the memory system 100 may access the target data TGT_DATA stored in the host memory buffer HMB (S870).

That is, the memory system 100 has a delay in accessing the target data TGT_DATA compared to the case of FIG. 7.

Comparing FIGS. 7 and 8, in the case that the host HOST maintains target data stored in the host memory buffer HMB when the memory system 100 is in the low power mode state, the memory system 100 may access the target data TGT_DATA more quickly, compared to the case where the host HOST does not maintain the target data stored in the host memory buffer HMB when the memory system 100 is in the low power mode state.

Hereinafter, a specific example of the above-described target data TGT_DATA will be described.

Figure 9:
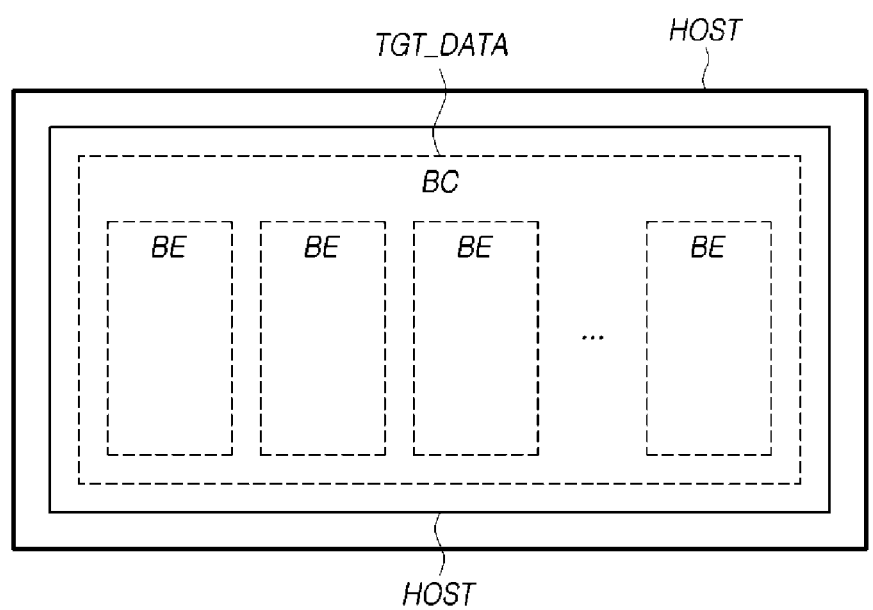
FIG. 9 illustrates an example of target data according to embodiments of the present disclosure.

FIG. 9 illustrates an example of target data TGT_DATA according to embodiments of the present disclosure.

Referring to FIG. 9, the target data TGT_DATA may be a booting context BC.

The booting context BC is data used to boot the memory system 100 when the memory system 100 wakes up from a low power mode state. For example, the booting context BC is a context necessary for operating each module included in the memory system 100. The booting context BC may include set values for NVMe features managed by the host interface layer (HIL) before entering the low power mode state and map data on the flash translation layer (FTL).

In embodiments of the present disclosure, the booting context BC may include a plurality of booting context entries BE. In this case, the size of each booting context entry BE may be a preset size. The memory system 100 may create the booting context entries BE by dividing the booting context BC into a plurality of segments having a preset size.

When the memory system 100 wakes up from the low power mode state, the memory system 100 loads the booting context into a memory (e.g., the working memory 125) within the memory system 100 to execute a booting operation and processes a 4 KB read command received from the host.

As described above, the time from when the memory system 100 wakes up from the low power mode state to the time when processing of the above-described 4 KB read command is completed may be determined as a booting time of the memory system 100. In this case, a requirement of the booting time of the memory system 100 may be determined by the host HOST.

In this case, the time required to load the booting context may occupy most of the booting time of the memory system 100. Therefore, in order to satisfy the requirement of the booting time of the memory system 100, it is important to reduce the time required to load the booting context.

In general, the memory system 100 loads the booting context from the memory device 110. However, if the memory system 100 loads the booting context from a location other than the memory device 110, the time required to load the booting context may be reduced.

In embodiments of the present disclosure, the memory system 100 stores the booting context in advance in the host memory buffer HMB, and when waking up from the low power mode state, the memory system may use both 1) a booting context pre-stored in the memory device 110, and 2) a booting context stored in the host memory buffer HMB. Accordingly, the memory system 100 may reduce the time required to load the booting context, compared to loading the booting context only from the memory device 110.

Hereinafter, an example of an operation in which the memory system 100 copies a booting context to the host memory buffer HMB in order to use the host memory buffer HMB will be described.

Figure 10:
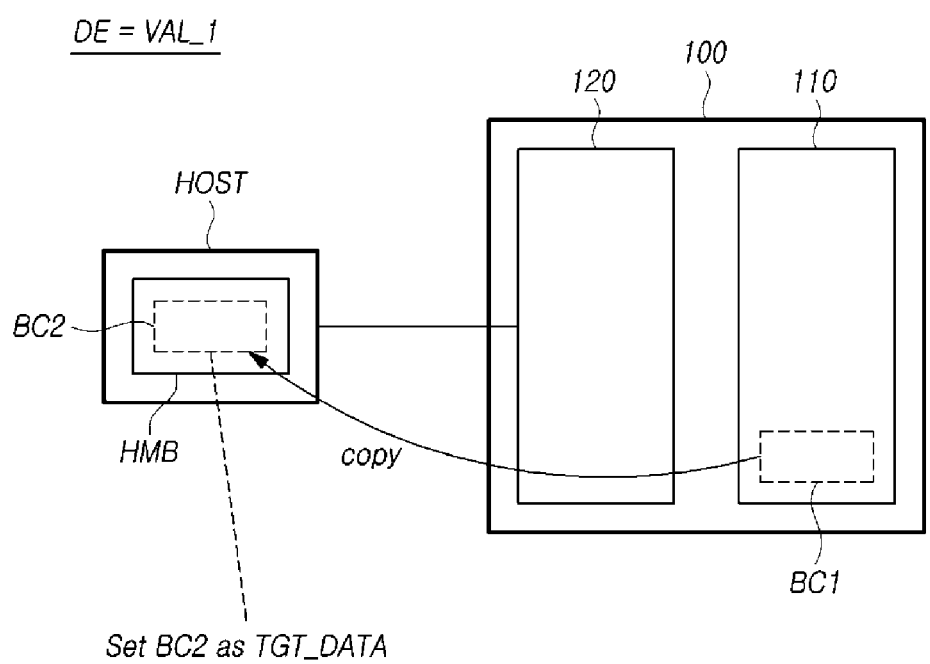
FIG. 10 illustrates an example of an operation in which a memory system copies a booting context to a host memory buffer according to embodiments of the present disclosure.

FIG. 10 illustrates an example of an operation in which a memory system 100 copies a booting context to a host memory buffer HMB according to embodiments of the present disclosure.

Referring to FIG. 10, the host HOST sets the value of the default enabled information DE as a first value VAL_1, and transmits the default enabled information DE to the memory system 100.

In this case, the memory controller 120 of the memory system 100 may copy a first booting context BC1, which is a booting context pre-stored in the memory device 110, to the host memory buffer HMB. That is, a second booting context BC2 which is a copy of the first booting context BC1 may be stored in the host memory buffer HMB.

The memory controller 120 may set the second booting context BC2 stored in the host memory buffer HMB as the target data TGT_DATA.

After the second booting context BC2, which is a copy of the first booting context BC1, is stored in the host memory buffer HMB, the first booting context BC1 may be updated. In this case, the memory system 100 also needs to update the second booting context BC2 to maintain the contents of the first booting context BC1 and the contents of the second booting context BC2 to be the same. Hereinafter, this will be described.

Figure 11:
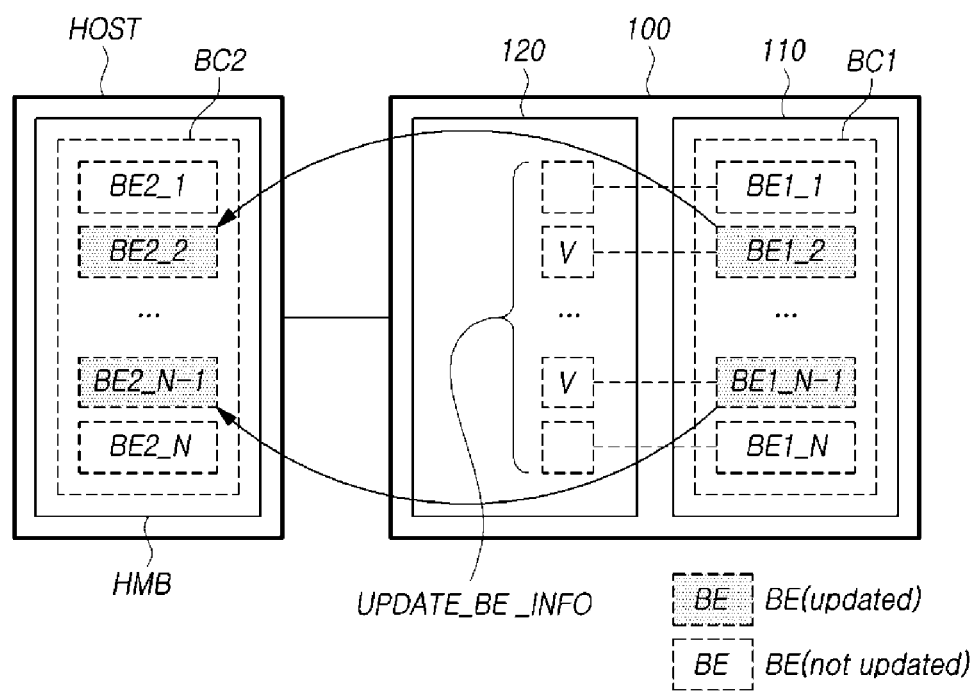
FIG. 11 illustrates an example of an operation of updating a second booting context by a memory system according to embodiments of the present disclosure.

FIG. 11 illustrates an example of an operation of updating a second booting context BC2 by a memory system 100 according to embodiments of the present disclosure.

In FIG. 11, the first booting context BC1 includes a plurality of booting context entries BE1_1, BE1_2, . . . , BE1_N-1, BE1_N, and the second booting context BC2 includes a plurality of booting context entries BE2_1, BE2_2, . . . , BE2_N-1, BE2_N.

The memory controller 120 of the memory system 100 may record an update booting context entry information UPDATE_BE_INFO before the memory system 100 enters the low power mode state.

The update booting context entry information UPDATE_BE_INFO means information about a booting context entry updated after the second booting context BC2 is stored in the host memory buffer HMB, among the plurality of booting context entries BE1_1, BE1_2, . . . , BE1_N-1, BE1_N, included in the first booting context BC1.

In FIG. 11, it has been described the case in which the update booting context entry information UPDATE_BE_INFO is stored in the memory controller 120 as an example, however, the update booting context entry information UPDATE_BE_INFO may be stored in the memory device 110. In addition, the update booting context entry information UPDATE_BE_INFO may be recorded using various data structures (e.g., bitmap, table, list).

As an example, in FIG. 11, the update booting context entry information UPDATE_BE_INFO indicates that the booting context entry BE1_2 and the booting context entry BE1_N have been updated, among the plurality of booting context entries BE1_1, BE1_2, . . . , BE1_N-1, BE1_N included in the first booting context BC1.

The memory controller 120 may update all or a part of the booting context entries BE2_1, BE2_2, . . . , BE2_N-1, BE2_N included in the second booting context BC2 stored in the host memory buffer HMB, based on the recorded update booting context entry information UPDATE_BE_INFO.

In FIG. 11, the memory controller 120 may update the booting context entry BE2_2 and the booting context entry BE2_N-1 among the booting context entries BE2_1, BE2_2, . . . , BE2_N-1, BE2_N included in the second booting context BC2. The booting context entry BE2_2 corresponds to a booting context entry BE1_2 included in the first booting context BC1, and the booting context entry BE2_N corresponds to a booting context entry BE1_N included in the first booting context BC1.

Hereinafter, an example of the operation described in FIG. 11 with reference to a flowchart will be described.

Figure 12:
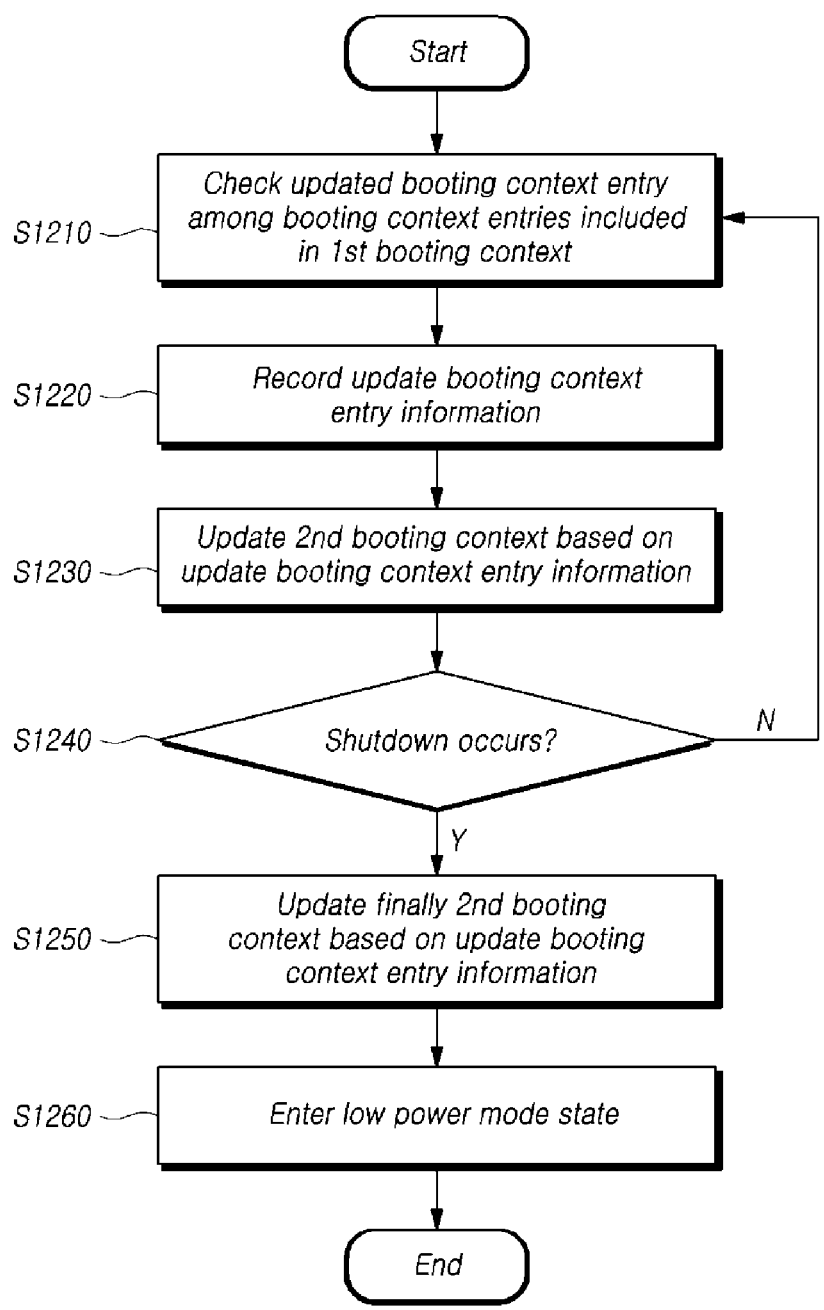
FIG. 12 is a flowchart illustrating an example of an operation of updating the second booting context described in FIG. 11 according to embodiments of the present disclosure.

FIG. 12 is a flowchart illustrating an example of an operation of updating the second booting context BC2 described in FIG. 11.

Referring to FIG. 12, the memory controller 120 of the memory system 100 may check an update booting context entry from among the booting context entries BE1_1, BE1_2, . . . , BE1_N-1, BE1_N included in a first booting context BC1 (S1210).

The memory controller 120 may record an update booting context entry information UPDATE_BE_INFO based on information on the updated booting context entry (S1220).

The memory controller 120 may update a second booting context BC2 stored in a host memory buffer HMB based on the update booting context entry information UPDATE_BE_INFO (S1230).

In addition, the memory controller 120 may determine whether a shutdown of the memory system 100 has occurred (S1240). If the shutdown does not occur (S1240-N), the memory controller 120 may return to operation S1210 again. This is because the booting context entries BE1_1, BE1_2, . . . , BE1_N-1, and BE1_N included in the first booting context BC1 may be additionally updated later.

On the other hand, if the shutdown occurs (S1240-Y), the memory controller 120 may finally update the second booting context BC2 stored in the host memory buffer HMB based on the last update booting context entry information UPDATE_BE_INFO (S1250). This is to reflect, to the second booting context BC2 before the shutdown is completed, additional changes that occur in the booting context entries BE1_1, BE1_2, . . . , BE1_N-1, and BE1_N during the shutdown process. Accordingly, the contents of the first booting context BC1 stored in the memory device 110 and the second booting context BC2 stored in the host memory buffer HMB are maintained to be identical.

Then, the memory controller 120 may enter a low power mode state (S1260).

In the above, it has been described an operation executed before the memory system 100 enters the low power mode state. Hereinafter, an operation executed when the memory system 100 wakes up from the low power mode state will be described.

Figure 13:
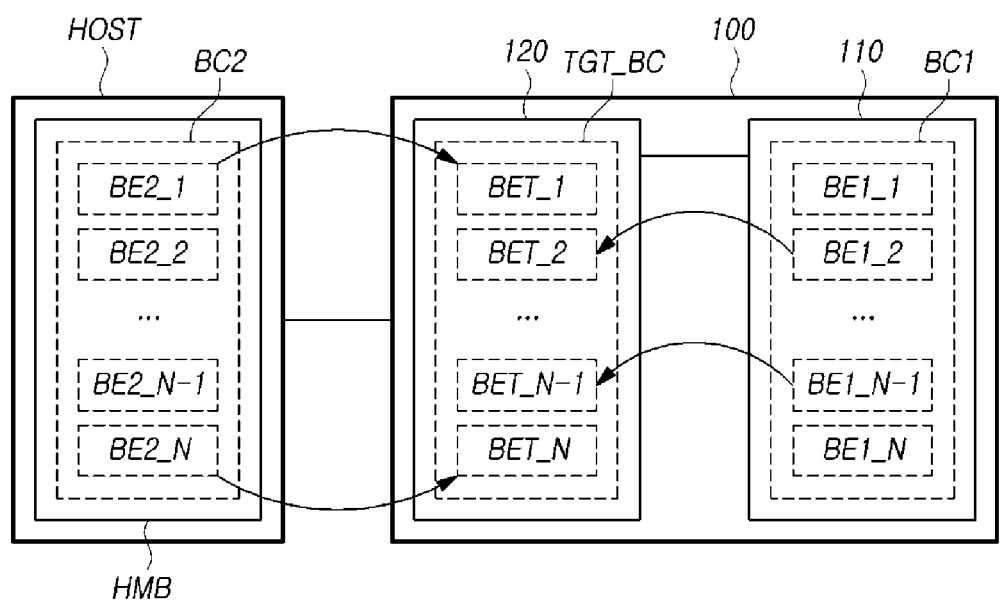
FIG. 13 illustrates an example of an operation of creating a target booting context when a memory system wakes up from a low power mode state according to embodiments of the present disclosure.

FIG. 13 illustrates an example of an operation of creating a target booting context TGT_BC when a memory system 100 wakes up from a low power mode state according to embodiments of the present disclosure.

Referring to FIG. 13, similar to FIG. 11, a booting context may include a plurality of booting context entries.

Referring to FIG. 13, the memory controller 120 of the memory system 100 may create a target booting context TGT_BC, which is a booting context used to boot the memory system 100 when the memory system 100 wakes up from a low power mode state.

As an example, the memory controller 120 may store the target booting context TGT_BC into the working memory 125 in the memory controller 120.

In this case, the memory controller 120 may load each of the booting context entries BET_1, BET_2, . . . , BET_N-1, BET_N to be included in the target booting context TGT_BC from a first booting context BC1 or a second booting context BC2.

For example, in FIG. 13, the memory controller 120 may, among the booting context entries BET_1, BET_2, ..., BET_N−1, BET_N to be included in the target booting context TGT_BC, (1) load a booting context entry BET_1 from a booting context entry BE2_1 among the booting context entries BE2_1, BE2_2, ..., BE2_N−1, BE2_N included in the second booting context BC2, (2) load a booting context entry BET_2 from the booting context entry BE1_2 among the booting context entries BE1_1, BE1_2, ..., BE1_N−1, BE1_N included in the first booting context BC1, (3) load a booting context entry BET_N−1 from a booting context entry BE1_N−1 among the booting context entries BE1_1, BE1_2, ..., BE1_N−1, BE1_N included in the first booting context BC1, and (4) load a booting context entry BET_N from a booting context entry BE2_N among the booting context entries BE2_1, BE2_2, ..., BE2_N−1, BE2_N included in the second booting context BC2.

Therefore, the memory controller 120 may selectively load the booting context entries BET_1, BET_2, ..., BET_N−1, BET_N to be included in the target booting context TGT_BC from the first booting context BC1 or the second booting context BC2. Accordingly, the memory controller 120 may load booting context entries BET_1, BET_2, ..., BET_N−1, BET_N to be included in the target booting context TGT_BC up to two times faster than when loading from only one booting context. This is because the memory controller 120 can simultaneously perform an operation of loading one of the booting context entries BET_1, BET_2, ..., BET_N−1, BET_N from the first booting context BC1, and an operation of loading the other one of the booting context entries BET_1, BET_2, ..., BET_N−1, BET_N from the second booting context BC2.

Hereinafter, an example of a method in which the memory controller 120 selectively loads the booting context entries BET_1, BET_2, ..., BET_N−1, BET_N to be included in the target booting context TGT_BC from the first booting context BC1 or the second booting context BC2 will be described.

Figure 14:
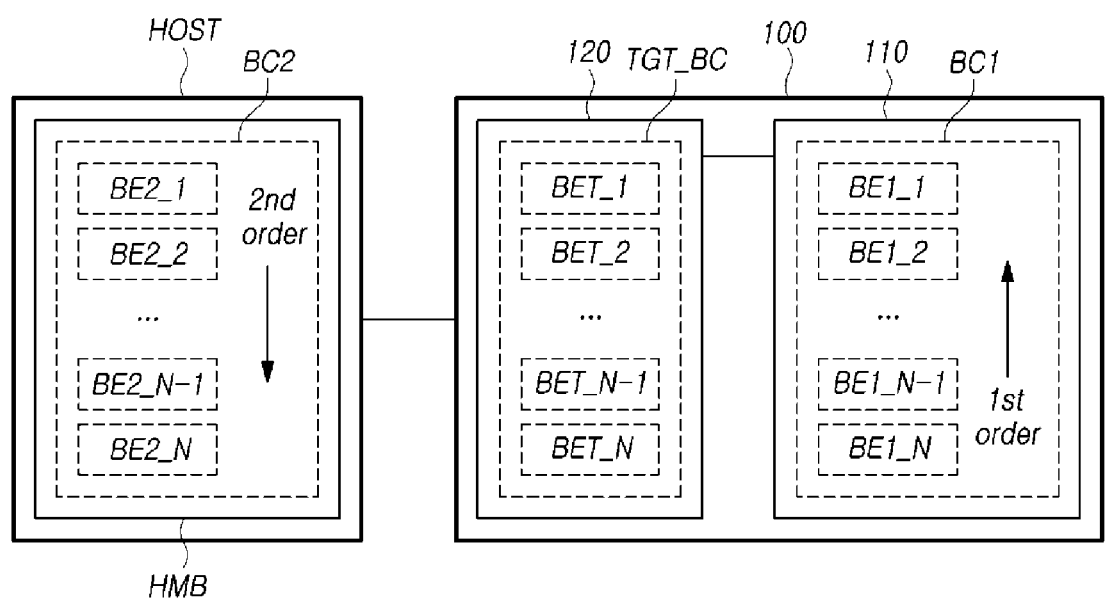
FIG. 14 illustrates an example of a method for creating a target booting context described with reference to FIG. 13 according to embodiments of the present disclosure.

FIG. 14 illustrates an example of a method for creating a target booting context TGT_BC described with reference to FIG. 13.

Referring to FIG. 14, in order to create the target booting context TGT_BC, the memory controller 120 of the memory system 100 may execute in parallel, until all booting context entries to be included in the target booting context TGT_BC are loaded, a first operation of loading the booting context entries BE1_1, BE1_2, ..., BE1_N−1, BE1_N included in the first booting context BC1 in a first order, and a second operation of loading the booting context entries BE2_1, BE2_2, ..., BE2_N−1, BE2_N included in the second booting context BC2 in a second order. That is, the first and second operations are performed simultaneously in units of the booting context entries.

In this case, the first order and the second order may be different. For example, the first order may be an ascending order and the second order may be a descending order. Conversely, the first order may be a descending order and the second order may be an ascending order.

Moreover, a criterion for determining the first order and the second order may be an index corresponding to each booting context entry. Each booting context entry included in one booting context may have a different index value, and in the case that the indexes of two booting context entries included in different booting contexts are the same, the two booting context entries correspond to each other.

In FIG. 14, the memory controller 120 may load the booting context entries BE1_1, BE1_2, ..., BE1_N−1, BE1_N included in the first booting context BC1 in the order of BE1_N→BE1_N−1→ ....

In addition, the memory controller 120 may load the booting context entries BE2_1, BE2_2, ..., BE2_N−1, BE2_N included in the second booting context BC2 in the order of BE2_1→BE2_2→ ....

As described above, the memory controller 120 may parallelly load booting context entries in a different order from the first booting context BC1 and the second booting context BC2. Accordingly, it is possible to prevent duplicate loading of booting context entries having the same index from the first booting context BC1 and the second booting context BC2, and increase the speed of creating the target booting context TGT_BC.

Figure 15:
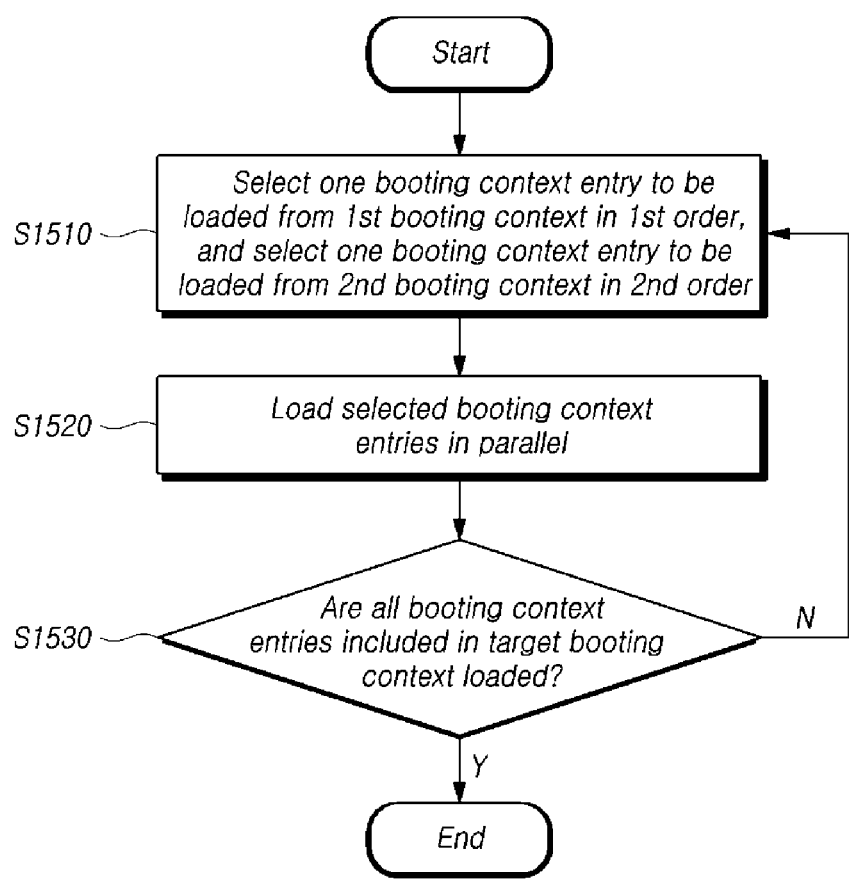
FIG. 15 is a flowchart illustrating an example of a method for creating a target booting context described with reference to FIG. 14 according to embodiments of the present disclosure.

FIG. 15 is a flowchart illustrating an example of a method for creating a target booting context TGT_BC described with reference to FIG. 14 according to embodiments of the present disclosure.

Referring to FIG. 15, the memory controller 120 of the memory system 100 may select one booting context entry to be loaded from the first booting context BC1 in a first order, and select one booting context entry to be loaded from the second booting context BC2 in a second order (S1510). In this case, the index of the booting context selected from the first booting context BC1 and the index of the booting context selected from the second booting context BC2 are different from each other.

In addition, the memory controller 120 may load the booting context entries selected in operation S1510 in parallel (S1520).

The memory controller 120 determines whether all of the booting context entries to be included in the target booting context TGT_BC are loaded (S1530).

If all booting context entries to be included in the target booting context TGT_BC are not loaded (S1530-N), the memory controller 120 may return to operation S1510 to additionally load booting context entries to be included in the target booting context TGT_BC.

On the other hand, if all of the booting context entries to be included in the target booting context TGT_BC are loaded (S1530-Y), the memory controller 120 may end an operation of creating the target booting context TGT_BC.

In the above, it has been described an operation in which the memory controller 120 creates the target booting context TGT_BC.

In order for the memory controller 120 of the memory system 100 to create the target booting context TGT_BC, there may occur an error in the process of loading each of the booting context entries included in the target booting context TGT_BC from the first booting context BC1 or the second booting context BC2. Accordingly, it is required for the memory controller 120 of the memory system 100 to search for a booting context entry in which an error has occurred among booting context entries included in the created target booting context TGT_BC, and to reload the booting context entry in which the error has occurred.

Figure 16:
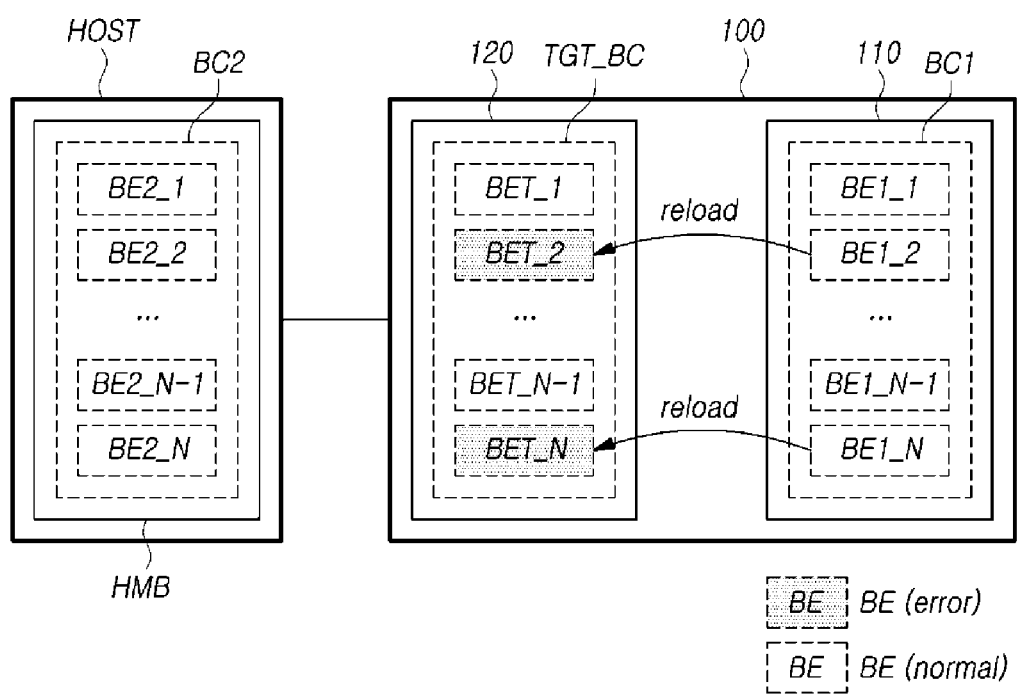
FIG. 16 illustrates an example of an operation in which the memory system reloads a booting context entry with an error according to embodiments of the present disclosure.

FIG. 16 illustrates an example of an operation in which the memory system 100 reloads a booting context entry with an error according to embodiments of the present disclosure.

Referring to FIG. 16, the memory controller 120 of the memory system 100 may search for a booting context entry in which an error has occurred among the booting context entries BET_1, BET_2, ..., BET_N−1, BET_N included in the target booting context TGT_BC.

As an example, the memory controller 120 may check the parity of each of the booting context entries BET_1, BET_2, . . . , BET_N-1, BET_N included in the target booting context TGT_BC. To this end, the memory controller 120 may separately calculate parity for each of the booting context entries BET_1, BET_2, . . . , BET_N-1, BET_N, or may obtain pre-calculated parity when loading booting context entries BET_1, BET_2, . . . , BET_N-1, BET_N.

In addition, the memory controller 120 may compare a parity of a target booting context entry which is one of the booting context entries BET_1, BET_2, . . . , BET_N-1, BET_N with a reference parity corresponding to the target booting context entry. The reference parity corresponding to the target booting context entry is a parity for a first booting context BC1 stored in the memory device 110, or a booting context entry corresponding to a target booting context entry among booting context entries included in a separately set reference booting context.

If the parity of the target booting context entry and the reference parity are different from each other, the memory controller 120 may determine that an error has occurred in the target booting context entry.

The memory controller 120 may reload a booting context entry in which an error occurs among booting context entries BET_1, BET_2, . . . , BET_N-1, BET_N included in the target booting context TGT_BC from the first booting context BC1.

In FIG. 16, the memory controller 120 may reload a booting context entry BET_2 and a booting context entry BET_N, which are booting context entries in which an error has occurred, among booting context entries BET_1, BET_2, . . . , BET_N-1, BET_N included in the target booting context TGT_BC, from the first booting context BC1.

Figure 17:
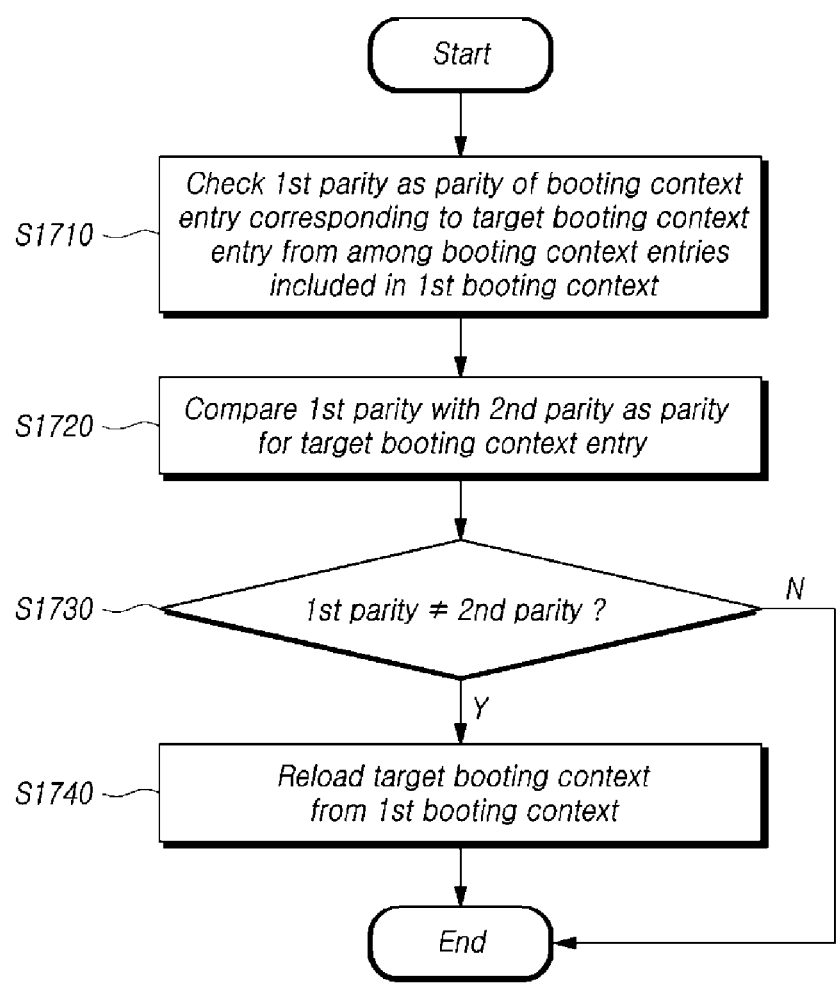
FIG. 17 is a flowchart illustrating an example of an operation of reloading the booting context entry with an error described in FIG. 16 according to embodiments of the present disclosure.

FIG. 17 is a flowchart illustrating an example of an operation of reloading the booting context entry with an error described in FIG. 16 according to embodiments of the present disclosure.

Referring to FIG. 17, the memory controller 120 of the memory system 100 may calculate a first parity that is a parity of a booting context entry corresponding to a target booting context entry from among booting context entries included in the first booting context BC1 (S1710). In this case, the target booting context entry means a booting context entry that is a target for determining whether an error occurs among booting context entries included in the target booting context TGT_BC.

In addition, the memory controller 120 may compare the first parity calculated in operation S1710 with a second parity, which is parity for the target booting context entry (S1720).

Further, the memory controller 120 may determine whether the first parity and the second parity are different (S1730).

If the first parity is different from the second parity (S1730-Y), this means that an error has occurred in the target booting context entry, so the memory controller 120 may reload the target booting context entry from the first booting context BC1 (S1740). On the other hand, if the first parity and the second parity are the same (S1730-N), this means that the target booting context entry is normal, so the memory controller 120 does not need to perform an operation of reloading the target booting context entry from the first booting context BC1.

Figure 18:
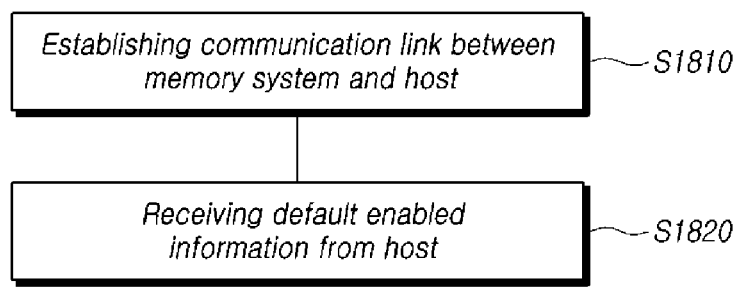
FIG. 18 illustrates an example of an operating method of a memory system according to embodiments of the present disclosure.

FIG. 18 illustrates an example of an operating method of a memory system 100 according to embodiments of the present disclosure.

Referring to FIG. 18, the operating method of a memory system 100 may include establishing a communication link between the memory system 100 and a communication host HOST (S1810)

In addition, the operating method of a memory system 100 may include receiving, from the host HOST, a default enabled information which is information indicating whether the host maintains a configuration of a host memory buffer HMB in the host and target data stored in the host memory buffer HMB, when the memory system 100 is in a low power mode state (S1820).

In this case, the memory system 100 may receive the default enabled information from the host HOST through a specific DWORD (e.g., DWORD 11) of a set features command for the host memory buffer HMB.

Figure 19:
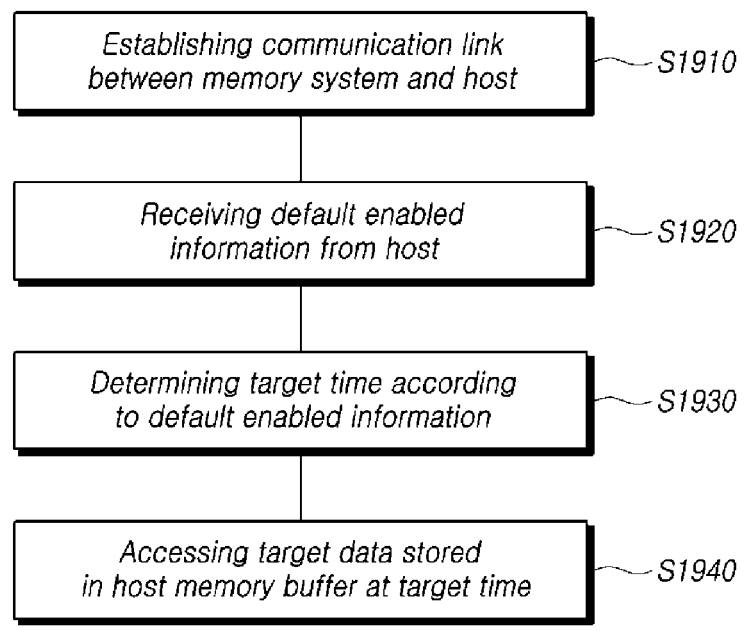
FIG. 19 illustrates another example of an operating method of a memory system according to embodiments of the present disclosure.

FIG. 19 illustrates another example of an operating method of a memory system 100 according to embodiments of the present disclosure.

Referring to FIG. 19, the operating method of a memory system 100 may include, similar to FIG. 18, establishing a communication link between the memory system 100 and a host HOST which communicates through the NVMe interface (S1910), and receiving, from the host HOST, a default enabled information which is information indicating whether the host maintains a configuration of a host memory buffer HMB in the host and target data stored in the host memory buffer HMB, when the memory system 100 is in a low power mode state (S1920).

In addition, the operating method of a memory system 100 may include determining a target time according to the default enabled information (S1930). The target time may be a time point at which the memory system 100 accesses the target data TGT_DATA after waking up from the low power mode state.

For example, (1) the target time may be determined as a time point at which a communication link between the host HOST and the memory system 10 is accessible, if the default enabled information DE indicates that the host HOST maintains the configuration of the host memory buffer HMB and the target data TGT_DATA stored in the host memory buffer HMB when the memory system 100 is in the low power mode state, or (2) the target time may be determined as a time point of receiving from the host HOST a set feature command indicating that the host memory buffer HMB is accessible, if the default enabled information DE indicates that the host does not maintain the configuration of the host memory buffer HMB and the target data TGT_DATA stored in the host memory buffer HMB when the memory system 100 is in the low power mode state.

In addition, the operating method of a memory system 100 may further include accessing the target data TGT_DATA stored in the host memory buffer HMB at the target time determined in operation S1930 (S1940).

Moreover, the target data TGT_DATA may be a booting context used to boot the memory system 100 when the memory system 100 wakes up from the low power mode state. The booting context may include a plurality of booting context entries.

In this case, the operating method of the memory system 100 may further include setting, as the target data TGT_DATA, a second booting context BC2, which is a copy of a first booting context BC1 stored in the memory device 110 if the default enabled information DE indicates that the host HOST maintains the configuration of the host memory buffer HMB and the target data stored in the host memory buffer HMB when the memory system 100 is in the low power mode state.

The operating method of the memory system 100 may further include, before the memory system 100 enters the low power mode state, (1) recording an update booting context entry information UPDATE_BE_INFO indicating, from among a plurality of booting context entries included in the first booting context BC1, a booting context entry updated after the second booting context BC2 is stored in the host memory buffer HMB, and (2) updating the second booting context BC2 based on the update booting context entry information UPDATE_BE_INFO.

The operating method of the memory system 100 may further include creating, when the memory system 100 wakes up from the low power mode state, a target booting context TGT_BC which is a booting context for booting the memory system 100 and loading each of the booting context entries to be included in the target booting context TGT_BC from the first booting context BC1 or the second booting context BC2.

The step of loading each of the booting context entries may include, for example, executing in parallel, until all booting context entries to be included in the target booting context TGT_BC are loaded, an operation of loading booting context entries included in the first booting context BC1 in a first order and an operation of loading booting context entries included in the second booting context BC2 in a second order.

The operating method may further include, for example, (1) searching for a booting context entry, in which an error occurs among the booting context entries included in the target booting context TGT_BC, and (2) reloading the booting context entry, in which the error occurs, from the first booting context BC1.

Figure 20:
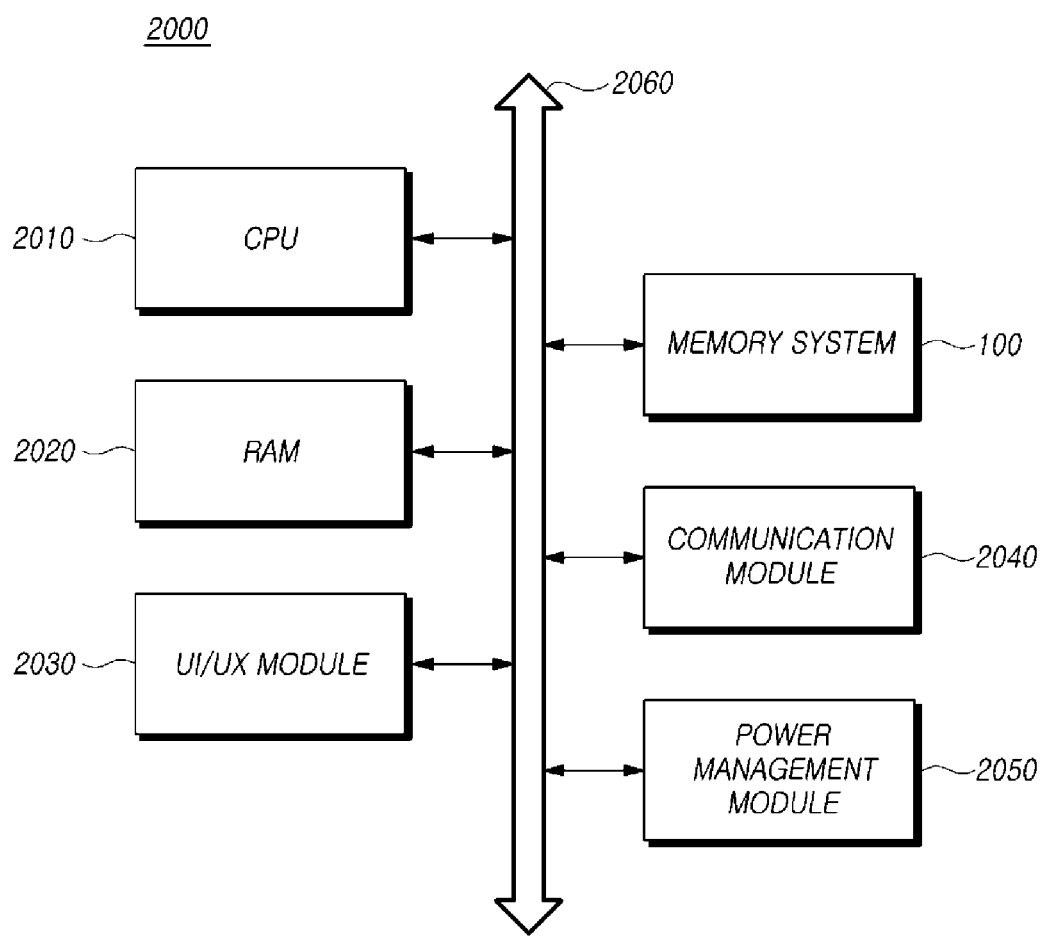
FIG. 20 is a diagram illustrating the configuration of a computing system based on some embodiments of the disclosed technology.

FIG. 20 is a diagram illustrating the configuration of a computing system 2000 based on an embodiment of the disclosed technology.

Referring to FIG. 20, the computing system 2000 based on an embodiment of the disclosed technology may include: a memory system 100 electrically connected to a system bus 2060; a CPU 2010 configured to control the overall operation of the computing system 2000; a RAM 2020 configured to store data and information related to operations of the computing system 2000; a user interface/user experience (UI/UX) module 2030 configured to provide the user with a user environment; a communication module 2040 configured to communicate with an external device as a wired and/or wireless type; and a power management module 2050 configured to manage power used by the computing system 2000.

The computing system 2000 may be a personal computer (PC) or may include a mobile terminal such as a smartphone, a tablet or various electronic devices.

The computing system 2000 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory system comprising:
a memory device capable of storing data; and
a memory controller configured to communicate with the memory device to control the memory device and receive a default enabled information from a host in communication with the memory system,
wherein the default enabled information indicates whether the host maintains a configuration of a host memory buffer in the host and target data stored in the host memory buffer when the memory system is in a low power mode state in which power supplied from the host is cut off.

2. The memory system of claim 1, wherein the memory controller receives the default enabled information from the host by using a specific double word (DWORD) of a set features command for the host memory buffer.

3. The memory system of claim 1, wherein the memory controller is further configured to:
determine, according to the default enabled information, a target time which is a time point at which the memory system accesses the target data after waking up from the low power mode state, and
access the target data stored in the host memory buffer at the target time.

4. The memory system of claim 3,
wherein the memory controller determines the target time as a time point at which a communication link between the host and the memory system is accessible if the default enabled information indicates that the host maintains the configuration of the host memory buffer and the target data stored in the host memory buffer when the memory system is in the low power mode state, and
wherein the memory controller determines the target time as a time point of receiving from the host a set feature command indicating that the host memory buffer is accessible if the default enabled information indicates that the host does not maintain the configuration of the host memory buffer and the target data stored in the host memory buffer when the memory system is in the low power mode state.

5. The memory system of claim 1, wherein the target data is a booting context used to boot the memory system when the memory system wakes up from the low power mode state, and the booting context includes a plurality of booting context entries.

6. The memory system of claim 5, wherein the memory controller is further configured to set, as the target data, a second booting context, which is a copy of a first booting context stored in the memory device when the default enabled information indicates that the host maintains the configuration of the host memory buffer and the target data stored in the host memory buffer when the memory system is in the low power mode state.

7. The memory system of claim 6, wherein the memory controller is further configured to, before the memory system enters the low power mode state:
   record an update booting context entry information indicating, from among a plurality of booting context entries included in the first booting context, a booting context entry updated after the second booting context is stored in the host memory buffer, and
   update the second booting context based on the update booting context entry information.

8. The memory system of claim 6, wherein the memory controller is further configured to:
   create, when the memory system wakes up from the low power mode state, a target booting context which is a booting context for booting the memory system, and
   load each of the booting context entries to be included in the target booting context from the first booting context or the second booting context.

9. The memory system of claim 8,
   wherein the memory controller loads the each of the booting context entries by executing in parallel, until all booting context entries to be included in the target booting context are loaded, an operation of loading booting context entries included in the first booting context in a first order and an operation of loading booting context entries included in the second booting context in a second order, and
   wherein the booting context entries loaded from the first booting context are different from the booting context entries loaded from the second booting context.

10. The memory system of claim 8, wherein the memory controller is further configured to:
    search for a booting context entry, in which an error occurs among the booting context entries included in the target booting context, and
    reload the booting context entry, in which the error occurs, from the first booting context.

11. An operating method of a memory system including a memory device capable of storing data, the operating method comprising:
    establishing a communication link between the memory system and a host in communication with the memory system; and
    receiving a default enabled information from the host,
    wherein the default enabled information indicates whether the host maintains a configuration of a host memory buffer in the host and target data stored in the host memory buffer when the memory system is in a low power mode state in which power supplied from the host is cut off.

12. The operating method of claim 11, wherein the default enabled information is received from the host by using a specific DWORD of a set features command for the host memory buffer.

13. The operating method of claim 11, further comprising:
    determining, according to the default enabled information, a target time which is a time point at which the memory system accesses the target data after waking up from the low power mode state; and
    accessing the target data stored in the host memory buffer at the target time.

14. The operating method of claim 11,
    wherein the target time is determined as a time point at which a communication link between the host and the memory system is accessible if the default enabled information indicates that the host maintains the configuration of the host memory buffer and the target data stored in the host memory buffer when the memory system is in the low power mode state, and
    wherein the target time is determined as a time point of receiving from the host a set feature command indicating that the host memory buffer is accessible if the default enabled information indicates that the host does not maintain the configuration of the host memory buffer and the target data stored in the host memory buffer when the memory system is in the low power mode state.

15. The operating method of claim 11, wherein the target data is a booting context used to boot the memory system when the memory system wakes up from the low power mode state, and the booting context includes a plurality of booting context entries.

16. The operating method of claim 15, further comprising setting, as the target data, a second booting context which is a copy of a first booting context stored in the memory device when the default enabled information indicates that the host maintains the configuration of the host memory buffer and the target data stored in the host memory buffer when the memory system is in the low power mode state.

17. The operating method of claim 16, further comprising, before the memory system enters the low power mode state:
    recording an update booting context entry information indicating, from among a plurality of booting context entries included in the first booting context, a booting context entry updated after the second booting context is stored in the host memory buffer; and
    updating the second booting context based on the update booting context entry information.

18. The operating method of claim 16, further comprising:
    creating, when the memory system wakes up from the low power mode state, a target booting context which is a booting context for booting the memory system; and
    loading each of the booting context entries to be included in the target booting context from the first booting context or the second booting context.

19. The operating method of claim 18,
    wherein the loading each of the booting context entries includes executing in parallel, until all booting context entries to be included in the target booting context are loaded, an operation of loading booting context entries included in the first booting context in a first order and an operation of loading booting context entries included in the second booting context in a second order, and
    wherein the booting context entries loaded from the first booting context are different from the booting context entries loaded from the second booting context.

20. The operating method of claim 18, further comprising:
    searching for a booting context entry in which an error occurs among the booting context entries included in the target booting context; and reloading the booting context entry in which the error occurs, from the first booting context.

* * * * *